United States Patent
Gedin et al.

(10) Patent No.: US 10,550,723 B2
(45) Date of Patent: Feb. 4, 2020

(54) AXIALLY-PARTITIONED OIL-DISTRIBUTION WHEEL, AND PLANETARY REDUCTION GEAR COMPRISING SUCH A WHEEL

(71) Applicant: Safran Transmission Systems, Colombes (FR)

(72) Inventors: Patrice Gedin, Moissy-Cramayel (FR); Pauline Marie Cecille Autran, Moissy-Cramayel (FR); Cécile Bruot, Moissy-Cramayel (FR); Guillaume Julien Beck, Moissy-Cramayel (FR); Alexis Dombek, Moissy-Cramayel (FR); Julie Lemoine, Moissy-Cramayel (FR); Jordane Peltier, Moissy-Cramayel (FR)

(73) Assignee: Safran Transmission Systems, Colombes (FR)

(*) Notice: Subject to any disclaimer, the term of this patent is extended or adjusted under 35 U.S.C. 154(b) by 4 days.

(21) Appl. No.: 16/073,197

(22) PCT Filed: Jan. 27, 2017

(86) PCT No.: PCT/FR2017/050200
§ 371 (c)(1),
(2) Date: Jul. 26, 2018

(87) PCT Pub. No.: WO2017/129926
PCT Pub. Date: Aug. 3, 2017

(65) Prior Publication Data
US 2019/0032514 A1    Jan. 31, 2019

(30) Foreign Application Priority Data
Jan. 28, 2016 (FR) .................................... 16 50696

(51) Int. Cl.
| F01D 25/18 | (2006.01) |
| F02C 7/36 | (2006.01) |
| F16H 57/04 | (2010.01) |

(52) U.S. Cl.
CPC ............... *F01D 25/18* (2013.01); *F02C 7/36* (2013.01); *F16H 57/0427* (2013.01);
(Continued)

(58) Field of Classification Search
CPC .. F01D 25/18; F16H 57/0427; F16H 57/0479; F16H 57/0482; F05D 2260/98; F05D 2220/36; F02C 7/36
See application file for complete search history.

(56) References Cited

U.S. PATENT DOCUMENTS 3,744,246 A * 7/1973 Doerner ............... F01D 25/18
60/685
6,223,616 B1 * 5/2001 Sheridan ............... F16H 1/2827
184/6.12
(Continued)

FOREIGN PATENT DOCUMENTS

WO   WO 2010/092263 A1   8/2010

*Primary Examiner* — Mark J Beauchaine
(74) *Attorney, Agent, or Firm* — Blank Rome LLP

(57) ABSTRACT

A wheel for distributing a lubricant in a turbine engine has an axis from which an annular cavity extends, open radially towards the axis and from which first and second lubricant supply lines depart for various members to be lubricated. Parallel to the axis, the annular cavity is split into at least a first and a second annular sub-cavity, which are separated by a substantially radial partition and which communicate with the first and second lines respectively.

10 Claims, 3 Drawing Sheets

(52) U.S. Cl.
CPC ..... *F16H 57/0479* (2013.01); *F16H 57/0482* (2013.01); *F05D 2220/36* (2013.01); *F05D 2260/40311* (2013.01); *F05D 2260/98* (2013.01)

(56) References Cited

U.S. PATENT DOCUMENTS

| | | | |
|---|---|---|---|
| 8,931,285 B2 * | 1/2015 | McCune | F01D 25/18 60/792 |
| 2013/0225353 A1 | 8/2013 | Gallet et al. | |

\* cited by examiner

AXIALLY-PARTITIONED OIL-DISTRIBUTION WHEEL, AND PLANETARY REDUCTION GEAR COMPRISING SUCH A WHEEL

CROSS-REFERENCE TO RELATED APPLICATIONS

This application is a national stage of International Application No. PCT/FR2017/050200, filed on Jan. 27, 2017, which claims the benefit of French Patent Application No. 1650696, filed on Jan. 28, 2016, the contents of each of which are incorporated herein by reference.

TECHNICAL FIELD

The present invention relates in particular to a lubricant distribution wheel in a turbine engine and an epicyclic speed reduction gear, intended to equip in particular a turboprop engine or a turbojet engine of an aircraft.

BACKGROUND

A speed reduction gear typically consists of an inner planet gear (also called a sun gear) driven by an input shaft, for example a turbine shaft, an outer planet gear (also called a crown gear), coaxial with the inner planet gear, with planets meshing with both the inner and the outer planet gears, and a planet carrier whereon the planets are mounted to rotate.

The variation of the reduction ratio of such a speed reduction gear is obtained by changing the number of teeth of the sun gear, of the planets and the outer crown gear, and the by the architecture of the speed reduction gear.

In turbine engines, lubricant wheels are known that have an axis around which an annular cavity extends:
which open radially towards the axis,
which is laterally bordered by a first wall and a second wall which are substantially radial to said axis, to receive the lubricant,
and from which at least first and second lubricant supply lines depart for lubricating various different members to be lubricated.

In WO 2010/092263, parallel to the axis around which the annular lubricant cavity extends, said cavity is split into at least a first annular sub-cavity and a second annular sub-cavity, which:
are separated by an annular inner partition substantially radial to said axis,
and communicate with the first and second lines respectively.

A set of problems lies in supplying these members to be lubricated with pressure. This is particularly the case when said members are located within the rotating field (such as reduction gear bearings and teeth) and are supplied from a pump situated at a fixed reference point. Furthermore, the lubricant requirements are distributed differently depending on the operating phases of the reduction gear. Moreover, in order to limit losses, it is necessary to lubricate as close as possible to the needs of each of the members in question, which calls for adjustment of lubricant distribution.

SUMMARY

The invention more particularly aims to provide a wheel solution that favours such adjustment, while allowing this supply of pressure to the members to be lubricated.

To this end, it is initially proposed that on this wheel, the aforementioned annular cavity has an overflow capacity at the location of said inner partition, so that an overflow of lubricant can take place, parallel to said axis, from the first sub-cavity into the second, and vice versa.

Mounted on an epicyclic reduction gear or on an oil supply device as follows, this wheel is designed to offer all or some of the following advantages:
provide lubrication without connecting parts between the circuits linked to the fixed reference point and those linked to the planet carrier typically provided on the reduction gear, resulting in advantages in terms of cost and reliability,
transfer the lubricant (typically oil) from a fixed reference point to the rotating reference point without wear parts, once again enhancing reliability,
allow modular mounting of the reduction gear in the engine, resulting in maintenance savings,
distribute the lubricant among the various different components of the reduction gear and vary this distribution depending on the operating phases of the reduction gear, resulting in optimisation of lubrication, an improvement in yield and a possible limitation of the overall weight of the engine (less lubricant used, therefore less taken on board),
ensure lubrication of the reduction gear if any of these supply systems malfunction (e.g.: blocked jet, excessively high flow rate, etc. . . . ), once again enhancing reliability.

In connection with the above, it is also recommended that, on the wheel, radially to its axis:
the first and second sub-cavities each have a bottom,
and that the inner partition has, in relation to each bottom, a height less than the heights of the first and second walls.

This will facilitate achievement of the desired overflow, via a simple embodiment of said overflow capacity at the location of the inner partition.

With regard to the aforementioned device intended for supplying oil to an assembly of pinions meshing on each other while rotating around a common axis of rotation (X), it is recommended that this device comprises:
a lubricating oil tank,
at least one fixed line to supply oil to said assembly and other lines to supply oil to the rotating meshing pinions, said other supply lines being movable in rotation around the common axis of rotation (X),
at least one oil ejection means for ejecting oil at the end of the fixed supply line,
and the above wheel, with all or some of its characteristics, said wheel being movable in rotation around the common axis of rotation (X) and positioned opposite said ejection means, in order to receive the oil.

The invention also relates to an epicyclic speed reduction gear as such, adapted to rotate around said common axis of rotation (X) and comprising:
the aforementioned assembly of pinions meshing on each other, and
the aforementioned oil supply device.

On this reduction gear, it will be preferred that the inner partition of the wheel in question is more distant from the axis of rotation (X) than the first and second lateral walls of this wheel are, so that an overflow of lubricant can take place, preferentially from one sub-cavity to another rather than outwards, parallel to said axis, from the first sub-cavity to the second sub-cavity and vice versa.

The advantages are among those already mentioned.

All or part of the above will also make it possible to achieve:
a dual-flow turbojet fan module comprising a fan shaft driven by an improved speed reduction gear, as above, and/or a turbine engine comprising at least one such speed reduction gear.

The invention also relates to a method of operation of the aforementioned oil supply device.

According to this method, provision is made for:
supplying oil to the annular cavity of the wheel via the oil ejection means such that initial distribution of lubricating oil occurs in the cavity of the wheel by means of the inner partition and an oil level or oil levels is/are thus created in said first and second sub-cavities,
subsequently oversupplying said first and second sub-cavities until the oil overflows at the location of the inner partition, into the other of said first and second sub-cavities of the wheel.

In some operating situations, lubricant consumption is higher than at other times. Furthermore, it may be desirable to avoid splashing of the members lubricated by the wheel in question.

Hence, it is furthermore possible, in a given situation, to continue oversupply of at least one of said first and second sub-cavities until they overflow towards the outside of the wheel.

For efficient operation of the wheel lubrication system, it is also recommended that, in order to supply and oversupply the annular cavity of the wheel with oil, the wheel is rotated and centrifugal pressure is created in its cavity as a function of the rotation speed of the wheel and the height of the oil column in said cavity.

BRIEF DESCRIPTION OF THE DRAWINGS

The invention will, if necessary, be better understood and other details, characteristics and advantages of the invention will become apparent on reading the following description as a non-exhaustive example with reference to the appended drawings in which.

DETAILED DESCRIPTION

Figure 1:
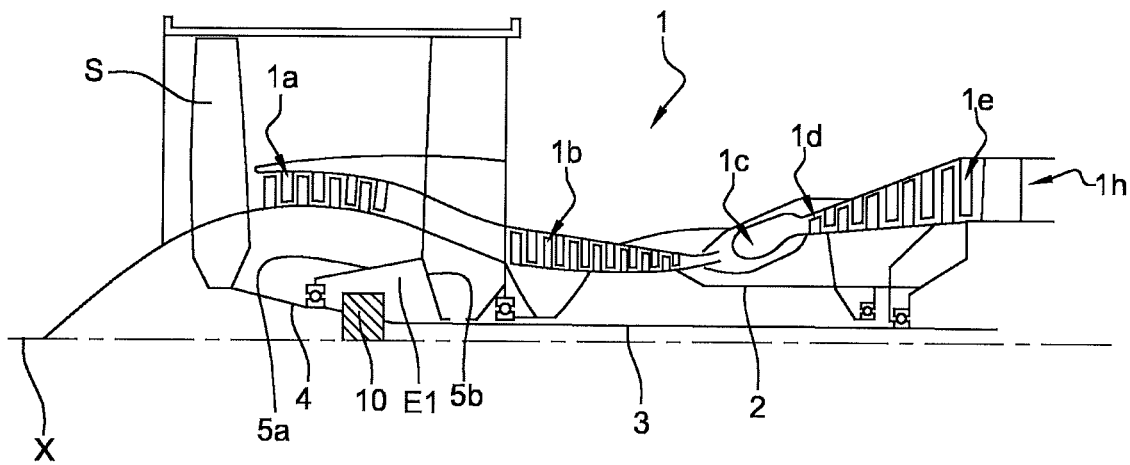
FIG. 1 shows a principle of a dual-flow turbojet.

With reference to FIG. 1, a turbine engine 1 can be seen, such as a turbojet in this case, which conventionally comprises, globally and successively along the longitudinal X axis of the turbine engine, a fan S, a low-pressure compressor 1a, a high-pressure compressor 1b, a combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and form with the later a high-pressure (HP) body. The low-pressure compressor 1a and the low-pressure turbine are connected by a low-pressure shaft 3 and form with the latter a low-pressure (LP) body. In the configuration illustrated, which involves a conventional turbofan, the disc on which the blades of the fan S are mounted is driven by a fan shaft 4, or LP trunnion, which is in turn directly driven by the LP shaft 3, via an epicyclic reduction gear 10.

The longitudinal X axis is the axis of rotation X of the turbine engine (around which the mobile blades of the fan S, of the compressors and of the turbines namely rotate). What is termed "radial" here is radial in relation to this X axis.

The blades of the fan S are borne by the fan shaft 4, which is connected to the engine structure. The downstream end of this fan shaft is fixed to the planet carrier 13 of the reduction gear 10. For its part, the LP shaft 3 is connected to the planet gear 11 of the reduction gear 10 by its ribs 7.

Figure 2:
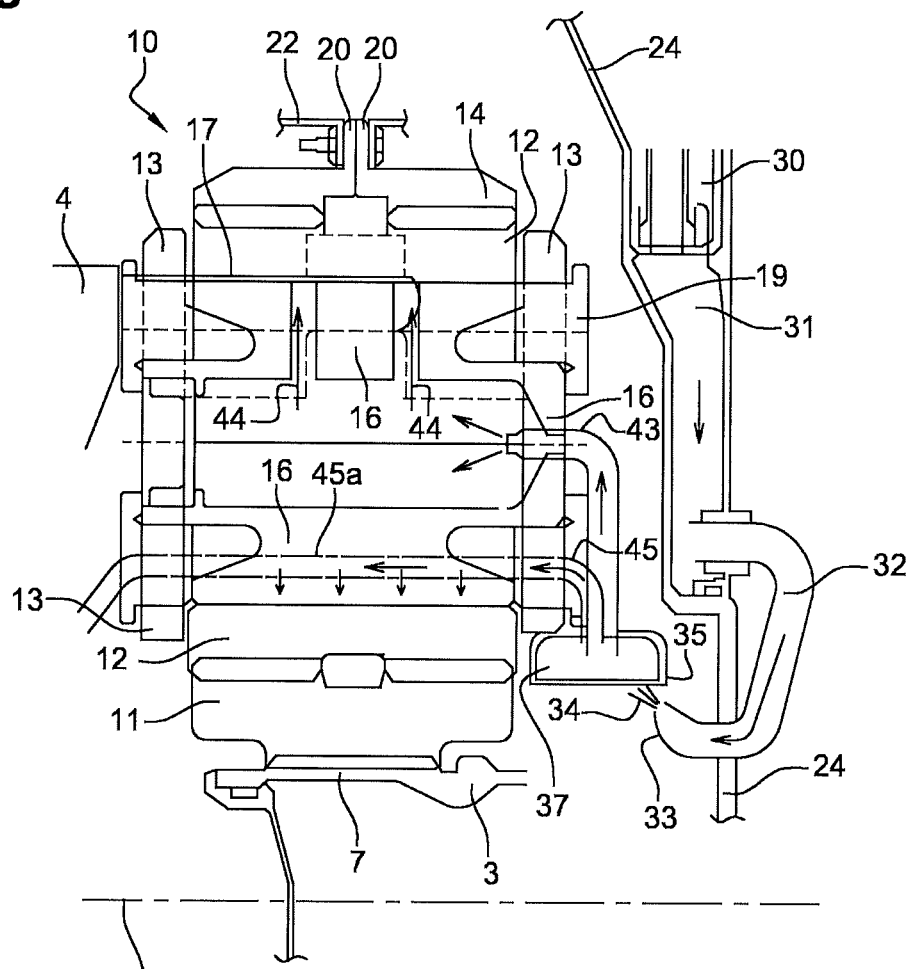
FIG. 2 shows a fan shaft epicyclic speed reduction gear, equipped with a lubrication system according to a possible embodiment, including details of supply of the lubricant to the reduction gear and within the latter, wherein the wheel is without the improvement according to the invention.
Figure 3:
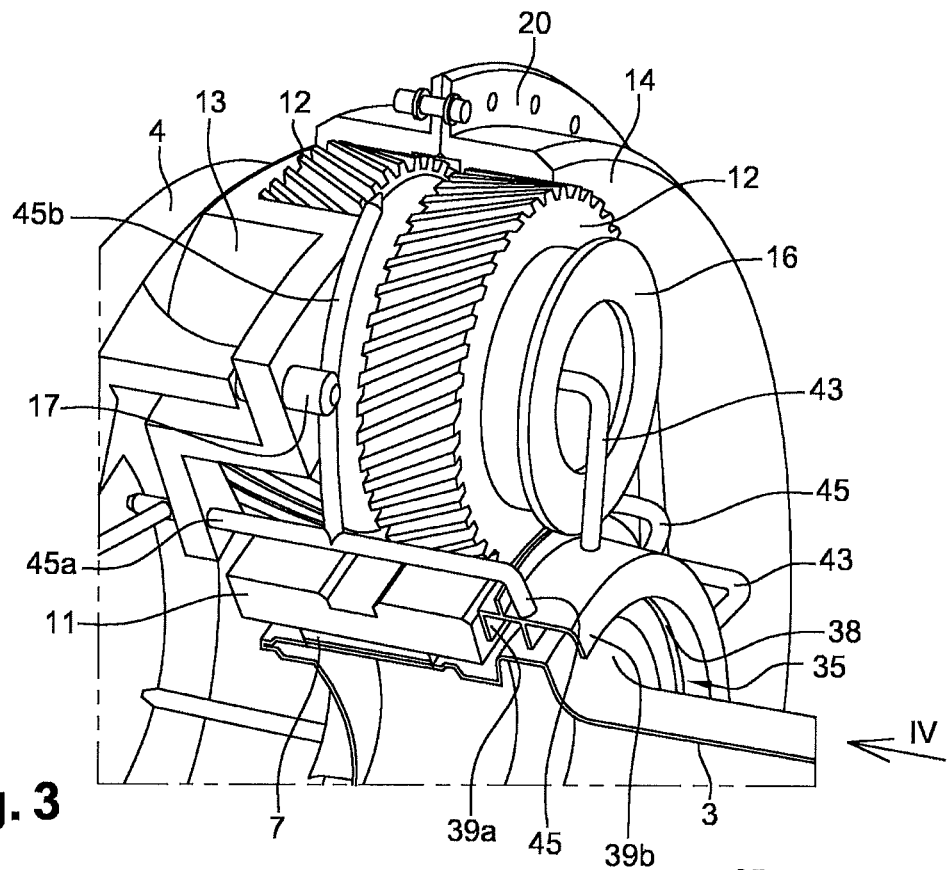
FIG. 3 is a cross-sectional perspective view of the above reduction gear, including the improvement according to the invention on the wheel.
Figure 4:
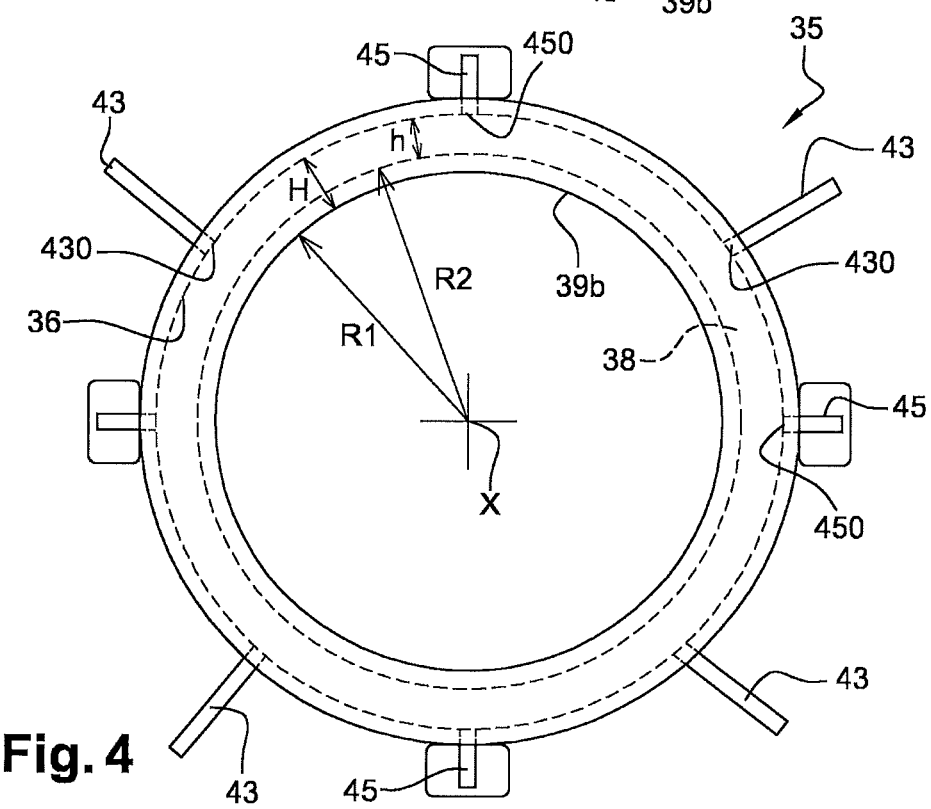
FIG. 4 is a side view along the arrow IV and FIGS. 5-7 show three states of filling of the above wheel.

FIG. 2 shows this and more generally, in a radial half cross-section, the upper part of the reduction gear 10, with the lower part being located symmetrically in relation to the axis of rotation X.

As illustrated, the reduction gear 10 is fastened to one end of a support casing 22 by means of closure and support flanges 20, which extend from the crown gear of the epicyclic reduction gear, thus securing the reduction gear to the fan shaft 2 and positioning it relative to the LP shaft 3.

The enclosure of the reduction gear 10 is pressurised in a casing 24. The purpose of the pressurisation casing 24 is to create an enclosure around the reduction gear that is at a pressure higher than the surrounding pressure, which is placed under vacuum by a suction pump aspirating the oil in the reduction gear 10. The casing 24 surrounds the support casing 22.

The reduction gear 10 is enclosed externally in its crown gear 14, which is not movable in rotation and is fastened to the engine structure at the flanges 20. The reduction gear engages, on the one hand, on ribs 7 of the LP shaft 3 via the gear pinions of the planet gear 11 of the epicyclic reduction gear and on the other hand, on the fan shaft 4, which is attached to the planet carrier 13 of this same epicyclic reduction gear. Conventionally, the sun gear pinion 11 drives a series of planet pinions 12, distributed regularly over the circumference of the reduction gear. These planets 12 also revolve around the X axis, rolling on the crown gear 14, which is attached to the turbine engine structure by the support casing 22. A planet axis 16, linked to a planet carrier 13, is positioned in the centre of each planet, with the planet rotating freely around this axis by means of a bearing, as illustrated. Rotation of the planets around their axis, owing to cooperation of their pinions with those of the crown gear 14, results in rotation of the planet carrier 13 around the X axis and consequently around that of the fan shaft 4 connected to it. The fan shaft 4 is driven by the planet carrier 13 by a series of centring fingers 17, which extend axially from the downstream end of the fan shaft 4. The planet carrier 13 extends symmetrically on either side of the reduction gear, forming an enclosure in which a lubrication function can be implemented. Bushings 19 complete closing of this enclosure by blocking the latter at the planet axes 16, on either side of the reduction gear.

The arrows in FIG. 2 show the path followed by the oil from a specific oil tank, known as the buffer tank 31, to the pinions and bearings to be lubricated. The buffer tank 31 is positioned next to the reduction gear, at the top so that the oil can flow by gravity towards the centre of the reduction gear. This tank 31 is fed by a line 30, originating from a main tank (not illustrated). From the buffer tank 31, the oil flows into at least one injector 32 equipped with at least one jet 33. The oil emerges from the latter in the form of a jet 34, which forms under the pressure produced jointly by the pressure of the feed pump and by the weight of the oil column located above the jet. This jet 34 is oriented with a radial component directed towards the outside of the engine and ends in an oil distribution wheel 35.

The wheel 35 forms a cavity for retaining the oil of the jet 34. This oil is driven in rotation by the wheel 35, in the bottom of which it is pressurised under the action of centrifugal force. Leading from the bottom of the wheel are respectively in 430 and 450 a series of lines for supplying oil to the various members to be lubricated. These lines, as illustrated based on FIG. 2, comprise:

- a first series of lines 43, equal in number to that of the planet pinions 12, which after the wheel penetrate into the inner closure of each planet shaft 16, which is closed again by the planet carrier 13,
- and a second series of lines 45, which, like the first, are distributed regularly over the periphery of the reduction gear and after the wheel 35, pass into the space located between two consecutive planet pinions 12.

The oil that circulates in the first lines 43 penetrates into the internal cavity of each planet axis 16. The centrifugal force drives it into guide channels 44 crossing these axes radially. These channels 44 emerge on the periphery of the planet axes 16, at their bearings supporting the planets 12, thereby lubricating these bearings. The second lines 45 pass, from the bottom of the wheel 35, between the planets 12 and branch into several channels 45a, 45b that convey the oil towards the gears formed on the one hand by the pinions of the planets 12 and those of the planet gear 11 and on the other hand by the pinions of the planets 12 and those of the crown gear 14. Each channel 45a extends axially along the planet pinion, between the planet pinion 12 and the planet gear 11. The line 45b, which supplies the gear between the crown gear 11 and the planets 12, projects its oil into the centre of the cylinder formed by each planet.

Functionally, the oil will flow by gravity from the buffer tank 31 into the injector 32. Under the pressure of the feed pump and the oil column located above the jet(s) 33, the oil is ejected and recovered by the rotating wheel 35 into which it flows. It subsequently passes into the first and second lines 43 and 45 of each planet 12. The oil passing through the first line 43 enters the inner cavity of the corresponding planet pinion 12 and is subsequently simultaneously subjected to the previous centrifugal force field and the field due to the rotation of the planet pinion around its planet axis 16. It crosses the thickness of the planet pinion 12 by means of the guide channels 44 and lubricates the bearing located between the planet 12 and its planet axis 16. The centrifugal acceleration field results in a pressure gradient along the pipe and ensures that this gradient results in a sufficiently high pressure (approximately 5 bars) at the bearing in order to be able to supply the latter. For its part, the oil passing through the second line 45 branches between the second supply line 45a of the planet gear and the second supply line 45b of the planet-crown gear system. The line 45a ejects oil over the entire width of both pinions by means of its lubricating bar. The line 45b runs up the planet pinion to its gearing on the crown gear 14 and ends in a jet that lubricates this gearing.

Hence, the lubrication means will be capable of ensuring the supply of lubricant from a radially inner area of the wheel 35 to the corresponding teeth and bearings.

The wheel 35 in this case is a cylindrical cup with a U-shaped radial section, the opening of which faces the axis of rotation X. While the (each) injector 32 and its jet 33 are fixed, the wheel 35 is movable in rotation around the X axis. The opening of the U-shaped bottom of the wheel 35 is opposite the axis of rotation X and the jet, and the edges of the U are oriented towards this axis.

The axis of the wheel around which its inner annular cavity 37 extends is therefore the X axis. Furthermore, the cavity 37 is thus open radially towards the axis, X and bordered laterally by a first and a second wall 39a, 39b substantially radial to said axis, to receive the lubricant.

The first and second lines 43, 45 for supplying lubricant to the bearings and teeth start from the cavity 37, as illustrated. In addition, parallel to the X axis, the cavity 37 is split into annular sub-cavities 40a, 40b, two in number in this case. These first and second sub-cavities are separated by an annular inner partition 38 substantially radial to the X axis and communicate with the first and second lines respectively.

The inner partition has, in relation to the respective bottoms 41a, 41b of the sub-cavities (these bottoms being laterally bordered by the first and second walls), a height h less than those (in this case identical, H) of the first and second walls 39a, 39b.

In other words, the radius R1 along which the free end of each side wall 39a or 39b extends circumferentially is smaller than the radius R2 along which the free end of the partition 38 extends circumferentially.

Figure 6:
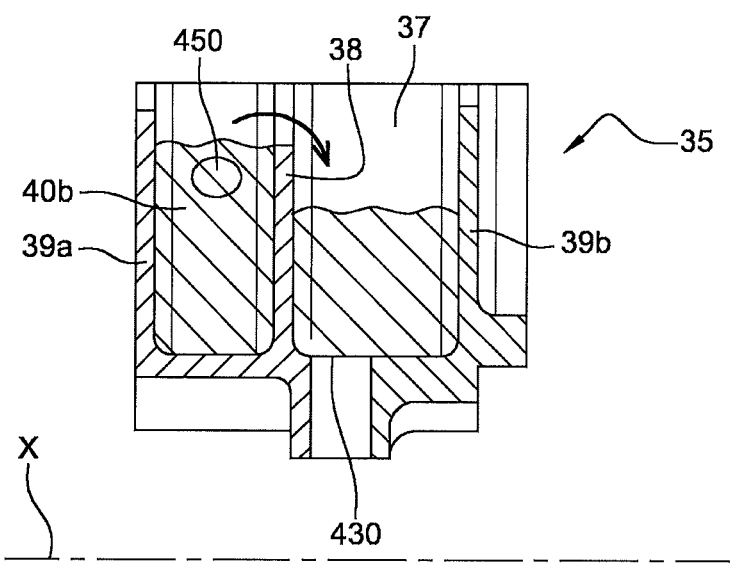

Hence, an overflow of lubricant will be able to occur within the wheel, parallel to the X axis, from the first sub-cavity to the second and vice versa (arrow in FIG. 6).

One will furthermore obtain a pinion gear speed reduction gear (11;12 . . . ) and a device for supplying oil to such an assembly of pinions meshing on each other while revolving around a common axis of rotation X, wherein said device comprises in particular:

- the lubricating oil tank 31,
- the fixed oil supply line 32 at the pinions,
- the oil supply lines 45, 45a, 45b at the rotating gears, with these supply lines therefore being movable in rotation around the X axis so as to follow the movement of said gears,
- the oil ejection means 33 at the end of the line 32,
- and the wheel 35, movable in rotation around the same X axis and therefore positioned opposite said ejection means 33, in order to receive the oil.

One will have noted the interest of these means 33 to be oriented with a radial component directed away from the X axis, in order to favourably supply the axially tiered sub-cavities 40a, 40b.

It should also be noted that modern turbine engines, in particular dual-flow turbojets, are conventionally produced by an assembly of modules which can comprise fixed parts and moving parts. A module is defined as a subassembly of a turbine engine, the interfaces with the adjacent modules of which display geometric characteristics that are sufficiently precise to allow its separate delivery. Assembly of such modules makes it possible to build a complete engine, by reducing to a minimum the operations of balancing and pairing of the parts in interface.

Such as module is achievable here, with its fan shaft 4 driven by a speed reduction gear of the type previously described.

By means of the aforementioned movable wheel 35, it will furthermore be possible to achieve a flow-pressure equilibrium in the sub-cavities, with the jets and the bearings being supplied with pressure and the wheel being driven in rotation, such that centrifugal pressure is created in the cavity 37 as a function of the speed of rotation of the wheel and the height of the oil column(s) in this cavity.

Figure 5:
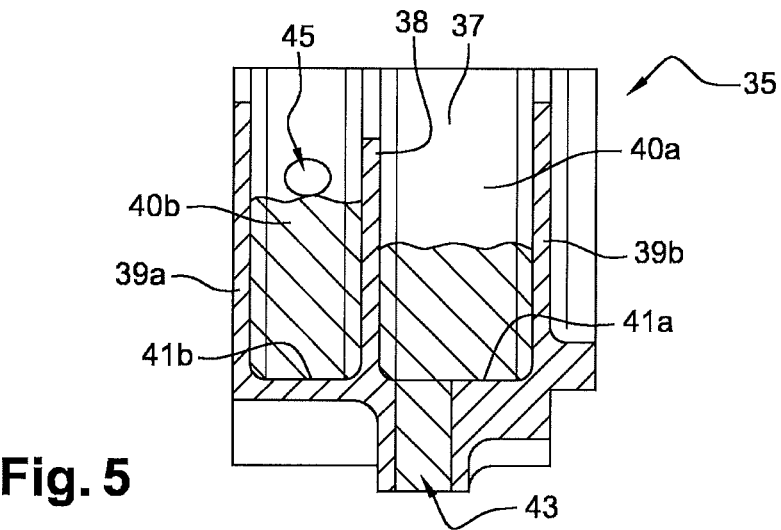

In order to ensure operation of the associated oil supply device, the sub-cavities 40*a*, 40*b* of the wheel are supplied with oil via the means 33 so that an initial distribution of lubricating oil occurs in the cavity 37 via the partition 38, with one (or a priori two) oil level(s) 47*a*, 47*b* being created accordingly in said sub-cavities (see FIG. 5).

In a situation in which this is required, such as during a climb or a take-off, one of these sub-cavities, such as that marked 40*b* in FIG. 6, will even be oversupplied until the oil overflows into the adjacent sub-cavity, parallel to the X axis, over the partition 38. The pressure required to discharge the oil flow is in this case higher than the full wheel pressure (situation in FIG. 5).

The flow rate of the overflowing sub-cavity then no longer increases. However, the flow rate of the sub-cavity 40*a* continues to increase. The distribution between the supply sections is therefore modified. If both sub-cavities are overflowing, the wheel overflows outwards (FIG. 7).

Figure 7:
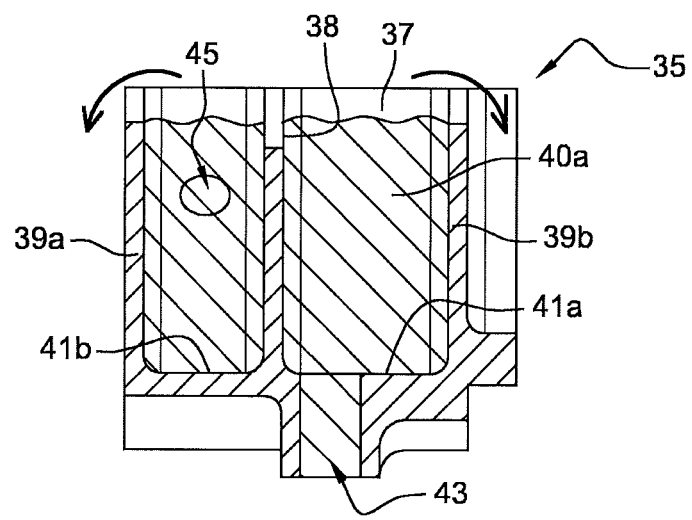

It should be noted that an alternative to a shorter inner partition 38, as in FIGS. 5-7, would have been to raise this partition and create through said inner partition, typically at the position of the radius R2, passages for the oil allowing overflow of one of the sub-cavities 40*a*, 40*b* towards the other, at the position of said inner partition.

The invention claimed is:

1. A lubricant wheel in a turbine engine, wherein the wheel has an axis around which extends an annular cavity:
    which opens radially towards the axis,
    which is laterally bordered by a first wall and a second wall which are substantially radial to said axis, to receive the lubricant,
    from which at least first and second lubricant supply lines depart for lubricating various different members to be lubricated,
    and which, parallel to said axis, is split into at least a first annular sub-cavity and a second annular sub-cavity, which:
        are separated by an annular inner partition substantially radial to said axis,
        and communicate with the first and second lines, respectively,
    wherein the annular cavity has an overflow capacity at the location of the inner partition, so that an overflow of lubricant can take place, parallel to said axis, from the first sub-cavity into the second sub-cavity and vice versa, without any overflow over the first wall and the second wall.

2. The wheel according to claim 1, wherein, radially relative to said axis:
    the first and second sub-cavities each have a bottom, and the inner partition has, in relation to each bottom, a height less than the height(s) of the first and second walls.

3. An oil supply device of an assembly of pinions meshing on each other while rotating around a common axis of rotation, wherein said device comprises:
    a lubricating oil tank,
    at least one fixed line to supply oil to said assembly, and other lines to supply oil to the rotating meshing pinions, said other supply lines being movable in rotation around the common axis of rotation,
    at least one means for ejecting oil at the end of the fixed supply line, and
    a wheel according to claim 1, movable in rotation around said common axis of rotation and positioned opposite said ejection means, in order to receive the oil, an oversupply of one of said sub-cavities allowing said oil overflow.

4. An epicyclic speed reduction gear adapted to rotate around an axis of rotation and comprising:
    an assembly of pinions meshing on each other while rotating around a common axis of rotation, and
    the oil supply device according to claim 3.

5. The speed reduction gear according to claim 4, wherein the free end of the inner partition is more distant from the axis of rotation than that/those of the first and second lateral walls of the wheel.

6. A dual-flow turbojet fan module comprising a fan shaft driven by a speed reduction gear according to claim 4.

7. A turbine engine comprising at least one speed reduction gear according to claim 4.

8. A method of operation of the oil supply device according to claim 3, according to which:
    oil is supplied to the annular cavity of the wheel via the oil ejection means such that an initial distribution of lubricating oil occurs in the cavity of the wheel by means of the inner partition and an oil level or oil levels is/are thus created in said first and second sub-cavities,
    an oversupply of one of said first and second sub-cavities occurs until the oil overflows at the location of the inner partition, into the other of said first and second sub-cavities of the wheel.

9. The method according to claim 8 wherein the oversupply of at least one of said first and second sub-cavities is continued until overflow towards the outside of the wheel.

10. The method according to claim 8, wherein for supplying and oversupplying the annular cavity of the wheel with oil, the wheel is rotated and a centrifugal pressure is created in the cavity as a function of the rotation speed of the wheel and the height of the oil column in said cavity.

* * * * *